United States Patent [19]

Blair

[11] Patent Number: 4,875,230
[45] Date of Patent: Oct. 17, 1989

[54] CELLULAR TELEPHONE UNIT HAVING MULTIPLE MEMORY LOCATION COMMAND LANGUAGE

[75] Inventor: Kevin B. Blair, Spring, Tex.

[73] Assignee: GTE Mobilnet Incorporated, Houston, Tex.

[21] Appl. No.: 223,864

[22] Filed: Jul. 25, 1988

[51] Int. Cl.[4] .............................................. H04Q 7/04
[52] U.S. Cl. ........................................ 379/63; 379/58
[58] Field of Search ..................... 379/63, 58, 59, 356, 379/355

[56] References Cited

U.S. PATENT DOCUMENTS

| | | | |
|---|---|---|---|
| 3,976,840 | 8/1976 | Cleveland et al. | 341/22 |
| 4,087,638 | 5/1978 | Hayes et al. | 379/58 |
| 4,412,218 | 10/1983 | Niitsu | 340/125.56 |
| 4,455,454 | 6/1984 | Umebayashi | 379/63 |
| 4,490,056 | 12/1984 | Whitaker | 400/100 |
| 4,528,696 | 7/1985 | Martin, III | 455/73 |
| 4,614,839 | 9/1986 | Umebayashi | 379/63 |
| 4,633,227 | 12/1986 | Menn | 340/365 VL |
| 4,637,022 | 1/1987 | Burke et al. | 371/37 |
| 4,661,659 | 4/1987 | Nishimura | 379/61 |
| 4,661,970 | 4/1987 | Akaiwa | 379/61 |
| 4,680,787 | 7/1987 | Marry | 379/63 |
| 4,723,264 | 2/1988 | Sasuta et al. | 379/58 |
| 4,736,410 | 4/1988 | Nishida et al. | 379/354 |
| 4,775,997 | 10/1988 | West, Jr. et al. | 379/58 |

*Primary Examiner*—Robert Lev

[57] ABSTRACT

A cellular telephone unit includes logic circuitry designed or programmed automatically to expand (recursively or iteratively) keystroke sequences containing recall commands by substituting the contents of a memory location specified by any recall command for the recall command itself. When a call is being initiated, any transmission keystrokes in a fully-expanded keystroke sequence occuring prior to a first pause command are transmitted over a signalling channel; transmission characters thereafter are transmitted on a voice channel.

4 Claims, 3 Drawing Sheets

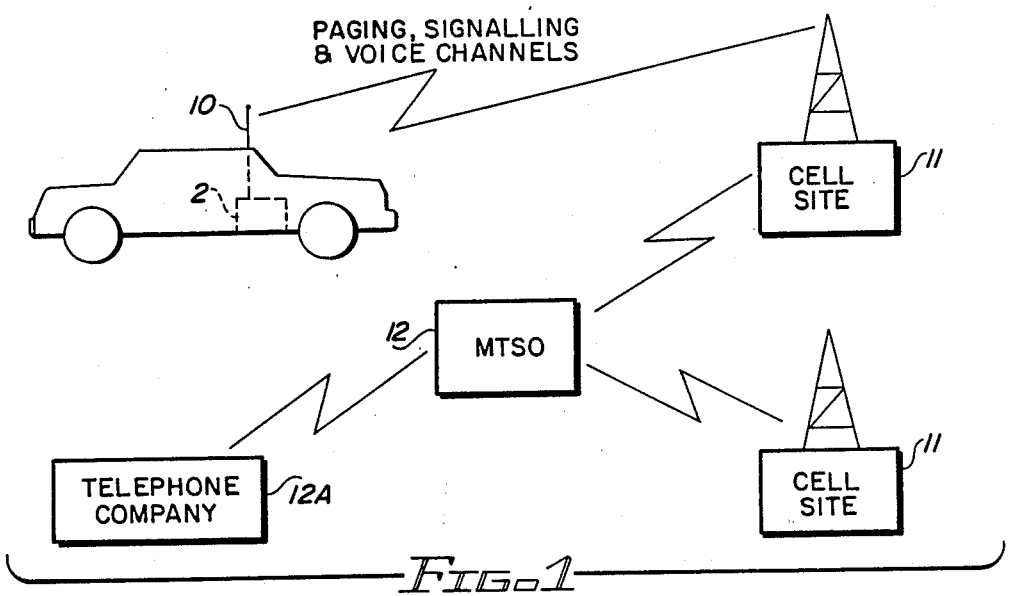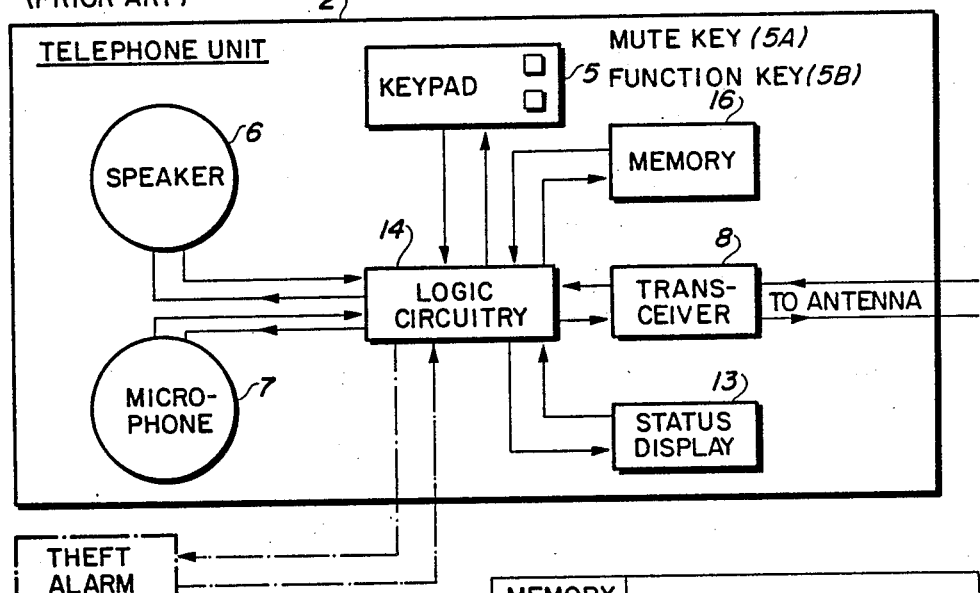

INTERACTIVE KEYSTROKE SEQUENCE EXPANDER ROUTINE

RECURSIVE KEYSTROKE SEQUENCE EXPANDER ROUTINE

CELLULAR TELEPHONE UNIT HAVING MULTIPLE MEMORY LOCATION COMMAND LANGUAGE

BACKGROUND OF THE INVENTION

This invention relates to telephones used in connection with, e.g., cellular telephone systems, and particularly to the provision of a multiple memory location command language for such telephones.

SUMMARY OF THE INVENTION

In accordance with the present invention, a telephone unit includes circuitry to allow various user-programmable memory locations to be addressed. This addressing allows for the convenient retrieval of, e.g., phone numbers, identification numbers, access codes, and keystroke commands.

Automatic multimemory location chaining with customer programmable pause durations facilitates the generation of, e.g., long dialing sequences through the recall of a single memory location. A memory location with recall commands is activated in the same manner as recalling an individual number from memory.

An embodiment of the invention described here is directed to a cellular telephone unit that includes an addressable memory having one or more memory locations. The telephone unit has a keypad on which keystrokes can be entered, and memory addressing circuitry for selectively storing one or more keystrokes as the contents of a specified said memory location in response to a STORE keystroke command sequence entered on said keypad.

Also included in the described embodiment is recognition circuitry for recognizing zero or more subsequences of keystrokes, within a keystroke sequence comprising one or more keystrokes entered on said keypad, as recall commands, each recall command specifies a corresponding memory location.

The described embodiment includes expansion circuitry for expanding each recall command by substituting the keystroke contents of the corresponding memory location into the keystroke sequence in place of the recall command. This substitution is performed repeatedly until the keystroke sequence comprises a final expanded keystroke sequence containing no recall commands.

Signal generation circuitry is included for generating signals in accordance with any zero or more transmission characters in said final expanded character sequence. Any signals, corresponding to any transmission characters in the final expanded character sequence that occur before the first of any zero or more pause characters in the final expanded character sequence, are generated on a signalling channel; signals thereafter are generated on a voice channel.

BRIEF DESCRIPTION OF THE DRAWINGS

FIG. 1 is block diagram of a typical mobile cellular telephone and its link with a fixed switching unit. FIG. 2 is a block diagram of some components of such a telephone.

FIG. 3 is a table depicting an example of user-programmable memory locations programmed in accordance with the invention.

Throughout the following detailed description, similar reference numerals refer to similar elements in all Figures of the drawings.

DETAILED DESCRIPTION OF SPECIFIC EMBODIMENTS

Figure 4:
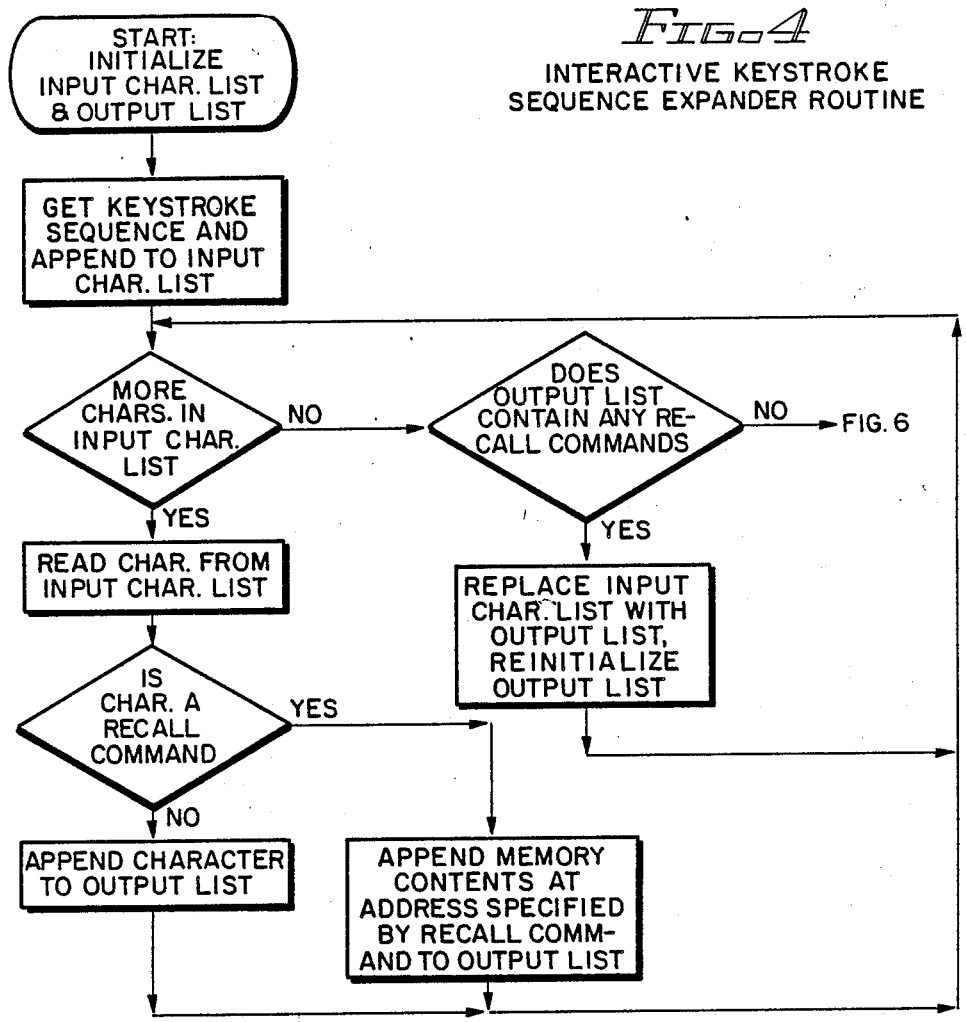
FIGS. 4 through 6 are flow diagrams of logical operations programmed for execution by the telephone in accordance with the invention.

An illustrative implementation of a microprocessor-based telephone system in accordance with the invention is presented here. The illustration uses an automobile cellular phone as an example, but it will be understood by those of ordinary skill that the invention can be implemented in virtually any telecommunications system.

Telephone Unit Linked to MTSO

FIGS. 1 and 2 show a typical automobile cellular telephone unit 2 having a unique mobile identification number (MID) stored in a suitable location such as an electrically eraseable programmable read-only memory (EEPROM, not shown). Telephone units of this kind are well known in the art and are described here only in sufficient detail to aid understanding the invention.

The telephone unit 2 includes a handset 4 having a keypad 5; equivalently, the keypad 5 could be located separately from the handset. Also included in the telephone unit 2 are a speaker 6 and a microphone 7, shown as being mounted within the handset 4 but either or both of which could equivalently be mounted apart from the handset, either separately (e.g., in a telephone operator's headset or in wall mountings), or approximately together (e.g., in a walkie-talkie or speakerphone configuration). It will be apparent to those of ordinary skill that if the keypad 5, the speaker 6, and the microphone 7 are all located apart from the handset 4, the handset can be dispensed with.

A transceiver 8, ordinarily built into the telephone unit 2, exchanges signals (via, e.g., an antenna 10) with a mobile telecommunications switching office (MTSO) 12, typically via radiotelephone signals relayed by one of several cell sites 11 that are in turn connected with the MTSO 12 via a landline. The MTSO 12 is ordinarily connected with a telephone company switch unit 12a via a high-capacity landline or similar connection.

Those of ordinary skill having the benefit of this disclosure will appreciate that the signal exchange may utilize any of a wide variety of transmission systems that are equivalent for purposes of this description. These include, for example, radio, electrical-type wire (such as telephone landlines), modulation of light beams (e.g., in fiberoptic networks or laser beams), and so forth. The signal exchange may use one or more of these media alone or equivalently in combination. Whether specific components such as the antenna 10 are needed for a given implementation of the invention will depend in part on the transmission system selected for implementation.

Status Display and Logic Circuitry

A status display 13 shows the status of the telephone unit 2. The status display 13 typically includes a NO SVC indicator to show that no cellular telephone service is available; and a ROAM indicator to show that the telephone unit 2 is outside its usual service area.

The transceiver 8 and antenna 10 are shown as being separate from the handset 4, but either or both could equivalently be built into the handset. The MTSO 12 could equivalently be another telephone or similar unit if both telephones had appropriate signalling, switching, and call processing capabilities.

The operation of the telephone unit 2 is controlled by logic circuitry 14. The logic circuitry 14 may be implemented in the form of, e.g., a microprocessor which executes program statements stored in a storage device such as a read-only memory, or equivalently by discrete logic components or one or more custom semiconductor chips.

The logic circuitry 14 includes signal generation circuitry designed or programmed to generate signals in response to commands from a user, e.g., as entered upon the keypad 5. Those of ordinary skill will appreciate that the operation of the telephone unit, 2, e.g., in dialing a sequence of numbers, is controlled by the logic circuitry 14 generally as follows, both in the prior art and in connection with the invention. Under control of the logic circuitry 14, the transceiver 8 transmits a cellular control signal to a cell site 11 over a signalling channel. The control signal includes a request that the MTSO 12 dial a specified telephone number and assign a voice frequency or channel for use by the telephone unit 2.

The programming of the logic circuitry 14 includes the capability of recognizing a unique "pause" command in a dialing sequence and of pausing a signalling operation (such as dialing of a number) for a specified period of time when a pause command is encountered.

The telephone unit 2 includes a read-write memory 16, accessible to the user and whose contents will not be affected by telephone power-downs of ordinary duration. For example, the memory 16 may equivalently comprise an EEPROM programmable by the user, a CMOS memory chip, or a conventional RAM with an independent power supply, any of which may possibly be implemented as part of a custom semiconductor chip.

It will be understood that telephones used in typical cellular systems are capable of generating both dual tone multi-frequency (DTMF) signals (DTMF signals produced by Bell telephones are referred to by the "Touch-Tone" trademark) and EIA standard IS-3-D cellular control signals.

It will be understood by those of ordinary skill having the benefit of this disclosure that the specific details of any given implementation may vary considerably depending on the particular microprocessor or other components selected. The selection of components and the arrangement and programming thereof will be a matter of choice by the artisan for the particular application desired.

Entry of Recall and Pause Commands

The logic circuitry 14 includes recognition circuitry designed or programmed to recognize recall commands within a keystroke sequence. As shown in FIG. 3, the memory 16 may be divided into one or more locations designated, e.g., by two-digit numbers 00, 01, 02, 03, and 04 (or equivalently by one-, three-, four-, or greater-digit numbers), limited only by the size of the memory 16.

The logic circuitry 14 is designed or programmed in a conventional manner to include memory addressing circuitry that permits a user to enter characters into any of the memory locations. The characters so entered may include the standard characters on a telephone keypad (the numerals 0 through 9, the asterisk (*), and the pound sign (#)), as well as a recall command (designated in FIG. 3 by R), followed by the memory location to be retrieved, and a pause command (designated by P).

Preferably, the logic circuitry 14 is designed or programmed so that the pressing of a mute key 5A (FIG. 2), during programming by a user of a memory location, causes a pause command to be entered into that memory location. The mute key 5A is of the type found on many cellular telephones while in the conventional memory programming mode. Some telephone units 2 do not have a mute key, but do have a function key such as the function key 5B shown in FIG. 2. On those, the logic circuitry 14 may be designed or programmed so that the function key 5B, followed by an appropriate numeric code to indicate a pause command, may be pressed during user memory programming in place of the mute key.

A pause command entered in either way occupies one character location in the memory 16; a suitable indicator such as the letter "P" may be displayed at the status display 13 to signify the entry of a pause command into the memory 16. Additional pause commands may be entered to extend the delay or a P followed by a number might be used to indicate the length of the delay.

The preferred programming of the logic circuitry 14 also permits a recall command to be entered into a memory location during user programming of the memory location by pressing the function key 5B followed by an appropriate numeric code (to indicate a recall command) and a code to designate one of the above memory locations.

It will be apparent to those of ordinary skill that this programming design takes advantage of common features (the mute key, function key, and memory programming mode) already familiar to users of typical telephone units 2. The actual programming of the logic circuitry 14 to accomplish these functions is conventional and is not described herein.

Processing of Memory Recall

Figure 5:
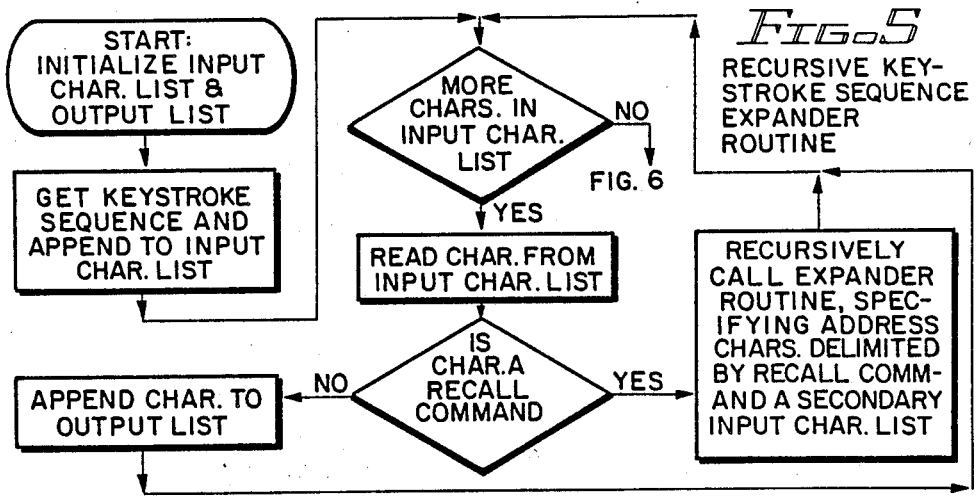

The logic circuitry 14 includes expansion circuitry designed or programmed to expand a recall command within a keystroke sequence into the contents of a memory location specified by the recall command. FIGS. 4 and 5 show the initial processing of a keystroke sequence entered by a user of the telephone unit 2 by the logic circuitry 14. The Figures depict, respectively, simple iterative and recursive keystroke sequence expander routines for execution by the logic circuitry 14. These routines are illustrative of many equivalent approaches to accomplishing the desired results described here.

As shown in FIGS. 4 and 5, a recall command stored in a user memory location is processed by substituting the contents of the memory location referenced by the recall command for the recall command itself. The contents so substituted may themselves contain a recall command, in which case the recall command is similarly expanded. Processing continues until the keystroke sequence is fully expanded, i.e., until no recall commands remain in the keystroke sequence.

It will be recognized by those of ordinary skill having the benefit of this disclosure that a recursive routine implemented in software may require somewhat less coding, but ordinarily requires more memory, than an iterative routine designed to achieve the same result. For purposes of this invention, the two are equivalent;

the selection of which type of routine to use in a given implementation is a matter of choice for the artisan.

Signal Generation

Figure 6:
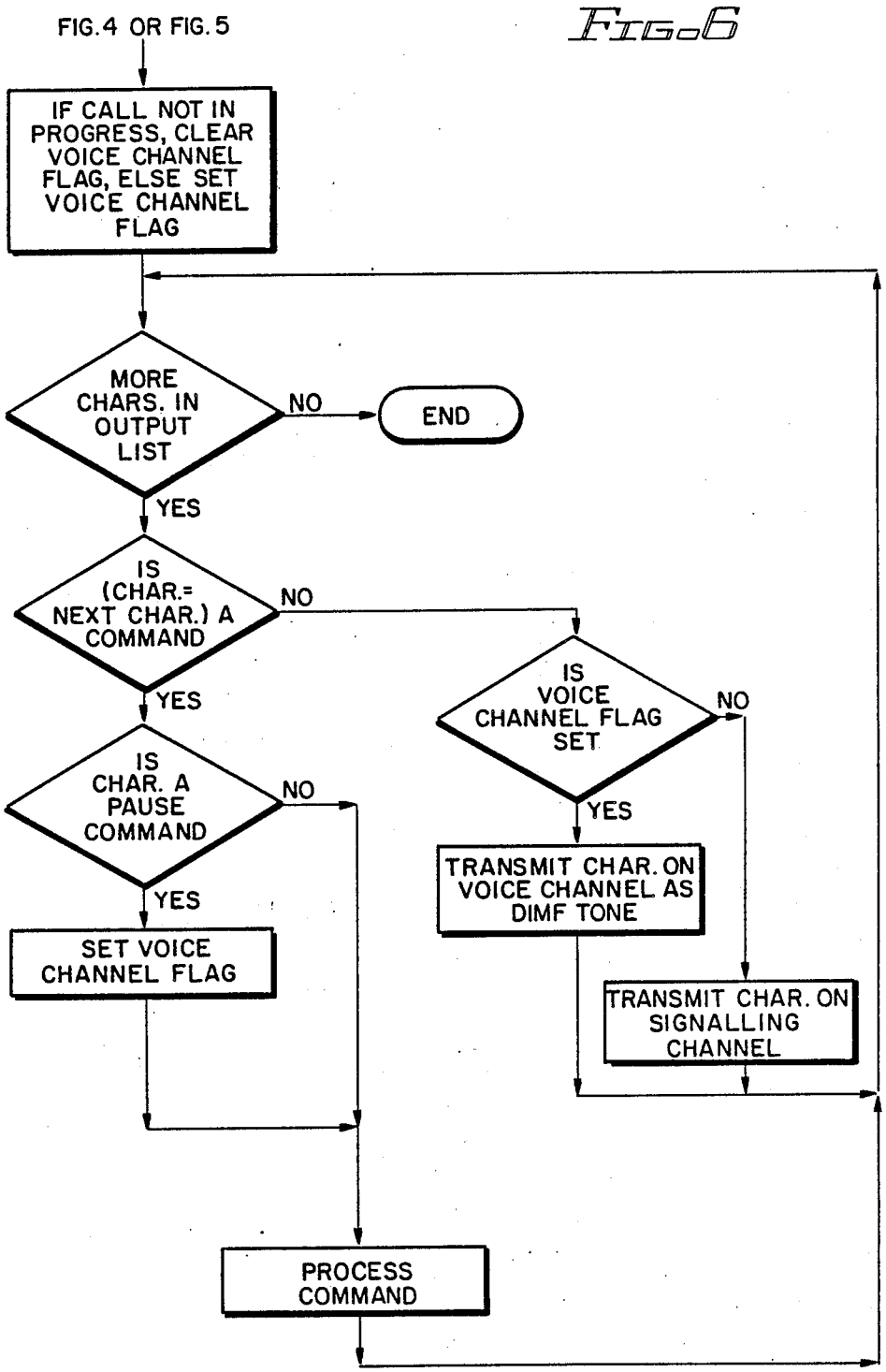

The signal generation circuitry is designed or programmed to process a fully-expanded keystroke sequence generally in accordance with FIG. 6. The processing has two modes, a call-in-progress mode and a call-not-in-progress mode.

If a call is in progress, all keystrokes are processed normally, and all characters to be transmitted (transmission characters) are transmitted over the voice channel, e.g., as DTMF tones. On the other hand, if a call is not in progress, all transmission characters up to the first pause command are transmitted on the signalling channel, e.g., as IS-3-D signals; subsequent transmission characters being transmitted on the voice channel, e.g., as DTMF tones.

This call-not-in-progress mode permits a series of recall commands prior to the first pause command, if any, to be used to direct the logic circuitry 14 to construct a signal for the signalling channel; likewise, a series of recall commands can be used to direct the logic circuitry 14 with respect to a signal for the voice channel.

The operation of the logic circuitry 14 can be illustrated by reference to FIG. 3, which depicts specific keystrokes stored in memory locations 01 through 04. In response to a recall and send of location 04, the four recall commands stored at that location are expanded. The number 18008778000 (stored in location 01) is sent over the signalling channel; in response to the first pause command (also in location 01), the telephone unit 2 sits idle for an arbitrary standard pause time (e.g., 2 seconds).

After the first pause times out, the number 07135551212 (stored in location 02) is sent over the voice channel, e.g., as DTMF tones. A second pause is triggered by the pause command in location 03, after which the number 123456789012324 (in location 03) is sent.

It will be appreciated by those skilled in the art having the benefit of this disclosure that this invention is believed to be capable of application in other situations in which the hardware and software work in substantially the same way to achieve essentially the same result. Some of these situations have been expressly described here (as examples and not as limitations), and others will be recognized by those of skill. Accordingly, this description is to be construed as illustrative only and as for the purpose of teaching those skilled in the art the manner of carrying out the invention.

It is also to be understood that various modifications and changes may be made, e.g., in the shape, size, and arrangement of components, operating steps, and so forth, without departing from the spirit and scope of the invention as set forth below in the claims. It is intended that the following claims be interpreted to embrace all such modifications and changes.

What is claimed is:

1. A cellular telephone unit comprising:
    an addressable memory having one or more memory locations;
    a keypad on which keystrokes can be entered;
    memory addressing circuitry, connected to said keypad and to said memory, for selectively storing one or more keystrokes as the contents of a specified said memory location in response to a STORE keystroke command sequence entered on said keypad;
    recognition circuitry for recognizing zero or more subsequences of keystrokes, within a keystroke sequence comprising one or more keystrokes entered on said keypad, as recall commands, each said recall command specifying a corresponding said memory location;
    expansion circuitry for expanding each said recall command by substituting the keystroke contents of the corresponding said memory location into said keystroke sequence in place of the recall command, repeatedly until said keystroke sequence comprises a final expanded keystroke sequence containing no recall commands.

2. A cellular telephone unit comprising:
    an addressable memory having one or more memory locations;
    a keypad on which keystrokes can be entered;
    memory addressing circuitry, connected to said keypad and to said memory, for selectively storing one or more keystrokes as the contents of a specified said memory location in response to a STORE keystroke command sequence entered on said keypad;
    recognition circuitry for recognizing zero or more subsequences of keystrokes, within a keystroke sequence comprising one or more keystrokes entered on said keypad, as recall commands, each said recall command specifying a corresponding said memory location;
    expansion circuitry for expanding each said recall command by substituting the keystroke contents of the corresponding said memory location into said keystroke sequence in place of the recall command, repeatedly until said keystroke sequence comprises a final expanded keystroke sequence containing no recall commands;
    signal generation means for generating signals in accordance with any zero or more transmission characters in said final expanded keystroke sequence;
    any of zero or more pre-pause signals, corresponding to any transmission characters that occur before the first of any zero or more pause characters in the final expanded keystroke sequence, being generated on a signalling channel; and
    any of zero or more post-pause signals, corresponding to any transmission characters in the final expanded keystroke sequence that occur after the first of any zero or more pause characters in the final expanded keystroke sequence, being generated on a voice channel.

3. Logic circuitry for generating cellular telephone signals based on one or more characters prestored in one or more specified locations in a memory system, said logic circuitry comprising:
    repetitive expansion means for expanding a sequence of characters keyed in by a user into a final expanded character sequence;
    said sequence of characters comprising zero or more recall commands, each recall command specifying a particular location in said memory system;
    retrieval means means for retrieving any character contents of the particular location specified by any recall command;
    said repetitive expansion means expanding any character contents of the memory system at the particular location specified by any said recall command by substituting the contents of said location in place of the recall command.

4. A method for transmitting one or more characters in a character sequence over a cellular telephone connection having a voice channel and a signalling channel, comprising the steps of:

initially clearing a voice channel flag;

if no more characters remain to be transmitted in the character sequence, ending the method;

getting a character from the character sequence;

if said character is a command having associated with it a sequence of method steps, performing a submethod COMMAND_PARSE;

else performing a submethod CHANNEL_SELECT; and continuing to perform the above steps beginning at;

said submethod COMMAND_PARSE comprising the steps of: (1) if said character is a pause command, setting the voice channel flag, and (2) performing the method steps associated with the command;

said submethod CHANNEL_SELECT comprising the steps of: (1) if said voice channel flage is set, transmitting the character on a voice channel, else (2) transmitting the character on a signalling channel.

* * * * *